United States Patent [19]
Ormond

[11] 3,985,025
[45] Oct. 12, 1976

[54] SHEAR MEASURING FLEXURE ISOLATED LOAD CELLS

[76] Inventor: Alfred Newman Ormond, 11969 E. Rivera Road, Santa Fe Springs, Calif. 90670

[22] Filed: Jan. 20, 1975

[21] Appl. No.: 542,369

[52] U.S. Cl. ............................ 73/141 A; 177/255
[51] Int. Cl.² ................................ G01L 1/26
[58] Field of Search ............. 73/141 A, 133 R; 177/211, 255

[56] References Cited
UNITED STATES PATENTS

| | | |
|---|---|---|
| 2,597,751 | 5/1952 | Ruge .................... 73/141 A X |
| 3,363,456 | 1/1968 | Laimins ................... 73/141 A |
| 3,377,849 | 4/1968 | Lebow ................... 73/136 R X |
| 3,693,425 | 9/1972 | Starita et al. ............ 73/141 A X |

Primary Examiner—Charles A. Ruehl
Attorney, Agent, or Firm—Ralph B. Pastoriza

[57] ABSTRACT

Horizontally loaded load cells are isolated by using an integrally formed flexure in the load cell body. Two or more of these cells can be secured to a platform to form a platform scale and the flexure isolation prevents the introduction of interaction terms resulting from extraneous torsion forces or moments from off-center loading on the platform.

2 Claims, 11 Drawing Figures

SHEAR MEASURING FLEXURE ISOLATED LOAD CELLS

This invention relates generally to force measuring techniques and more particularly to load cell bodies having integrally formed flexure means for isolation of extraneous forces.

BACKGROUND OF THE INVENTION

It is common practice to utilize load cells for force measuring operations. Normally, the load cells may take the form of columns or shear plates having strain gauges affixed in a manner to provide an output signal indicative of the force applied to the load cell. One or more of the load cells in turn are usually connected to a structure designed with suitable flexure supports so that only desired components of forces to be measured will be transmitted to the load cells.

BRIEF DESCRIPTION OF THE PRESENT INVENTION

The present invention contemplates an integrally formed load cell body and flexure means which will isolate undesired forces from the load responsive means in the load cell. By providing such an integral arrangement, the expense of providing separate flexures and securing them between load cells and force applying structures is avoided. Moreover, the problems involved heretofore with isolating extraneous forces from the load cells themselves are avoided.

Briefly, the invention contemplates in its preferred form utilizing at least two flexure isolated load cells for connection between a stationary structure and two peripheral points on a platform. Each flexure isolated load cell in turn comprises a load cell body having first and second end portions for securement respectively to the stationary structure and a peripheral point on the platform, a straight line passing through the first and second end portions being substantially parallel to the plane of the platform in the absence of any load on the platform. One end portion of each load cell includes strain gauge means responsive to a force on the platform having a component normal to the plane of the platform. The other end portion of each load cell includes integrally formed flexure means. With this arrangement, torsion forces and moments created by off-center loading of the platform are isolated from the strain gauge means on each load cell by the integrally formed flexure means in each load cell.

BRIEF DESCRIPTION OF THE DRAWINGS

A better understanding of the invention will be had by now referring to specific examples of embodiments thereof as shown in the accompanying drawings in which.

DETAILED DESCRIPTION OF THE INVENTION

Figure 1:
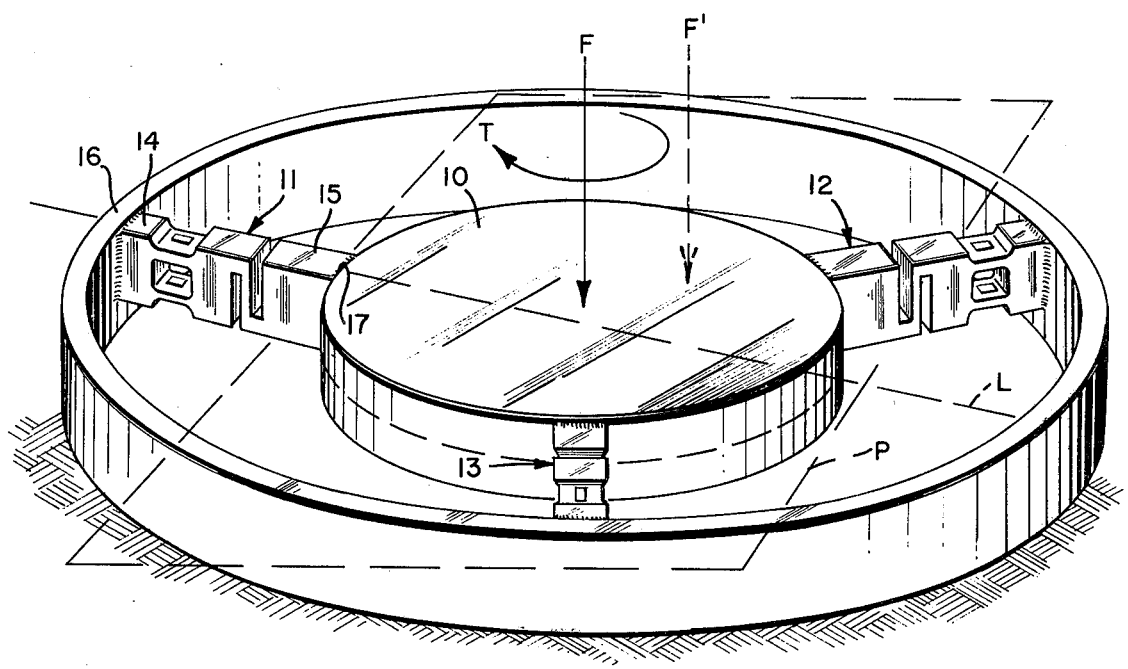
FIG. 1 is a fragmentary perspective view of a loading platform utilizing three of the flexure isolated load cells in accord with a first embodiment of the present invention.

Referring first to FIG. 1 there is shown a platform 10 which might constitute a weighing scale together with three flexure isolated load cells designated generally by the numerals 11, 12 and 13. As shown, each flexure isolated load cell comprises a load cell body having first and second end portions such as indicated at 14 and 15 for the load cell body 11, for securement respectively to a stationary structure 16 and a peripheral point 17 on the platform. The arrangement is such that a straight line drawn between the first and second end portions 14 and 15 of the load cell body as indicated at L is substantially parallel to the plane of the platform, indicated at P in the absence of any load on the platform.

In the particular embodiment illustrated in FIG. 1, the other load cell bodies 12 and 13 are similarly secured between the stationary structure 16 and peripheral points of the platform preferably the load cell bodies being spaced at 120° to each other so that the support points are evenly spaced. It should be understood, of course, that more than three load cell bodies could be provided.

In FIG. 1, a normally applied force F is indicated by the arrow on the platform 10. It is possible, however, that this force F may be off center as indicated at F' by the dashed arrow. This off center loading can give rise to moments acting on the points of connection of the load cell bodies to the platform. Also undesirable torsion forces can be generated as indicated by the circular arrow T.

Each of the load cell bodies described in FIG. 1 is identical and therefore a detailed description of one will suffice for all.

Figure 2:
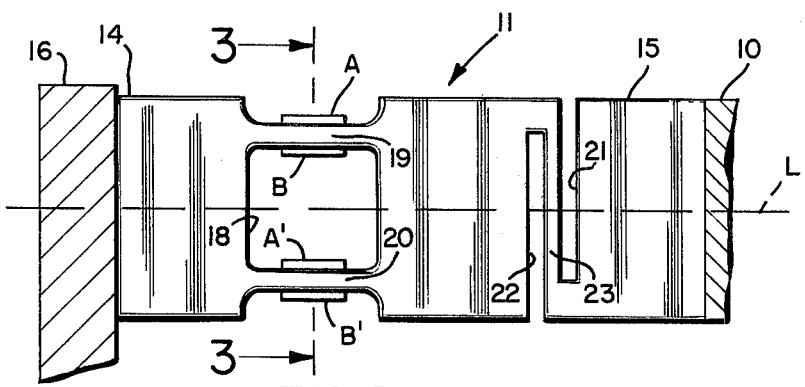
FIG. 2 is an enlarged side elevational view of one of the flexure isolated load cells illustrated in FIG. 1.

Thus referring to FIG. 2 there is shown the load cell body 11 wherein the first end portion 14 includes a central cut out 18 to define spaced parallel body portions 19 and 20 on opposite sides of the straight line L passing through the first and second end portions. Suitable strain gauges designated A, B, and A', B' are fixed to opposite sides of the body portions as shown.

The second end portion 15 of the load cell body 11 in turn includes oppositely directed slots 21 and 22 defining therebetween a flexure web 23 lying in a plane perpendicular to the straight line L and to the plane of the platform of FIG. 1 when the second end portion is secured thereto.

Figure 3:
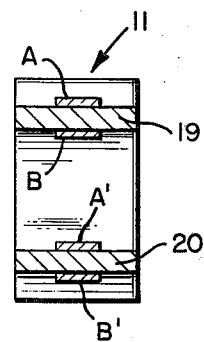
FIG. 3 is a cross section taken in the direction of the arrows 3—3 of FIG. 2.

The disposition of the strain gauges shown in FIG. 2 will be more evident by referring to the cross section of FIG. 3 wherein it will be noted that the spaced parallel body portions 19 and 20 are relatively thin so that they can flex and thus generate strains in the strain gauges in response to loading of the second end portion of the load cell body.

Since the flexure web 23 is between the second end portion at the point of its connection to the platform and the strain gauge means, it functions to isolate in cooperation with the other flexures certain extraneous forces generated upon loading of the platform of FIG. 1.

Figure 4:
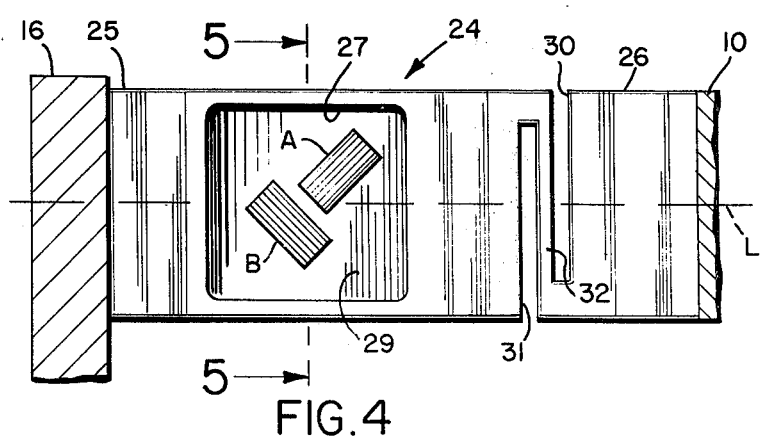
FIG. 4 is an elevational view of a modified type of flexure isolated load cell which could be used in place of the load cell of FIG. 2.

FIG. 4 shows another type of strain gauge flexure isolated load cell wherein strains in the strain gauges themselves are generated by a shear plate rather than through flexure of thin spaced parallel body portions as in FIG. 2.

Thus referring to FIG. 4, the load cell body is shown at 24 as having first and second end portions 25 and 26 for connection between the stationary structure 16 and a peripheral point of the platform 10 of FIG. 1.

Figure 5:
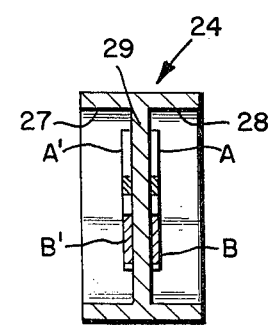
FIG. 5 is a cross section taken in the direction of the arrows 5—5 of FIG. 4.

Referring to both FIGS. 4 and 5, it will be noted that the first end portion 25 includes recessed areas 27 and 28 on opposite sides of the straight line L passing between the end portions to define a thin plate 29 between the recessed areas. This plate lies in a plane including the straight line L and normal to the plane of the platform. Strain gauges A, B and A', B' are fixed to opposite surfaces of the plate 29 as shown.

A flexure means similar to that shown in FIG. 2 is formed in the second end portion 26. Thus there are provided oppositely directed slots 30 and 31 defining therebetween a flexure web 32 lying in a plane perpendicular to the straight line L and to the plane of the platform.

Figure 6:
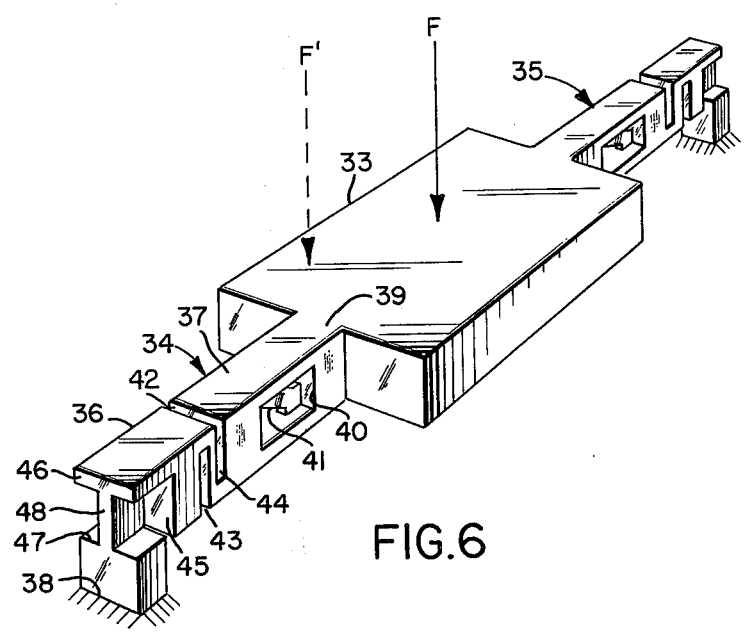
FIG. 6 is a perspective view of another embodiment of the invention utilizing only two flexure isolated load cells.

Referring now to FIG. 6 there is shown a platform 33 wherein only two flexure isolated load cells 34 and 35 support the platform. In the embodiment of FIG. 6, compound flexure arrangements are provided to permit flexing about two axes at right angles to each other in order that torsional forces can be isolated from the strain gauges in the load cells. The two load cells are similar in construction so that a detailed description of one will suffice for both.

Figure 7:
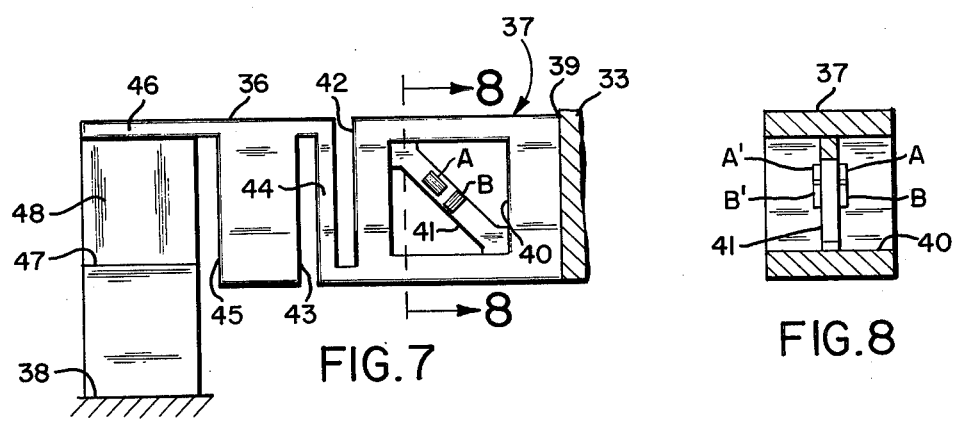
FIG. 7 is an enlarged side elevational view of one of the flexure isolated load cells in FIG. 6.
Figure 8:
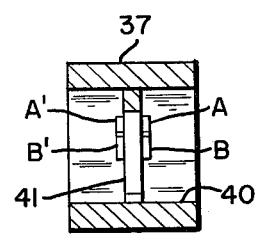
FIG. 8 is a cross section taken in the direction of the arrows 8—8 of FIG. 7.

Referring specifically to the flexure isolated load cell 34 as shown in FIGS. 6, 7, and 8 first and second end portions 36 and 37 are secured respectively between ground or a stationary structure 38 and the platform 33 as at 39. In the embodiment of FIG. 6, the first end portion 36 includes integrally formed flexure means while the second end portion 37 incorporates load cell strain gauge means. These two end portions, of course, could be reversed in positions since the movement between the platform and the stationary ground structure is purely relative. Positioning of the flexure isolation means in the first end portion 36 with the load cell strain gauge structure in the second end portion 37 is shown merely to indicate that either end portion of the overall load cell arrangement can be used.

As shown most clearly in FIG. 7, the strain gauge load cell portion includes a window cut out 40 through the second end portion 37 with a diagonal bar 41 integrally formed thereacross and of thin dimensions in a vertical plane; that is, a plane perpendicular to the plane of the platform. Suitable strain gauges indicated at A and B and A' and B' (FIG. 8) are disposed on opposite sides of the bar 41 as shown.

The integrally formed flexure means in turn is provided in the first end portion 36 as by slots 42 and 43 extending into opposite sides of the load cell body to define a first flexure web 44 therebetween. This flexure web 44 is perpendicular to a straight line passing between the first and second end portions and also is normal to the plane of the platform 33.

In addition to the first described flexure web 44, there is provided a cut out portion 45 leaving an upper flange 46 in opposed relationship to a lower body portion 47 between which extends a vertical web 48. The lower portion 47 is secured to the stationary structure or ground as at 38. It will be noted that the plane of the second flexure web 48 is perpendicular to the plane of the first flexure web 44 and the plane of the platform 33 so as to be generally parallel and include the referred to straight line passing between the first and second ends of the load cell body.

Figure 9:
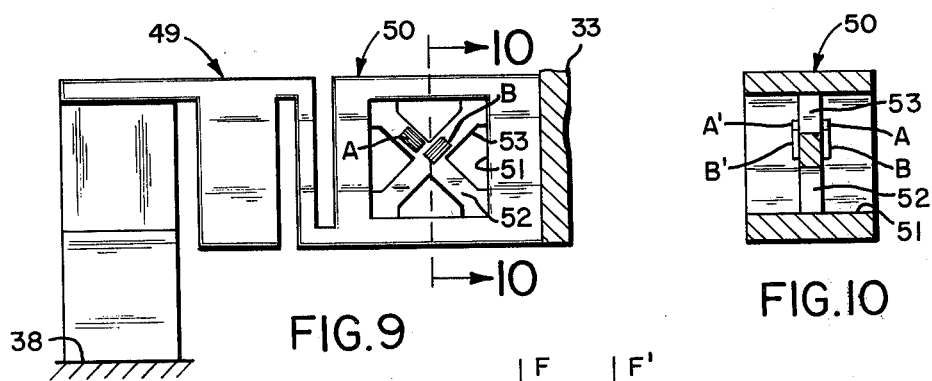
FIG. 9 is an enlarged elevational side view of a modified flexure isolated load cell which could be used in place of the load cells shown in FIG. 6.
Figure 10:
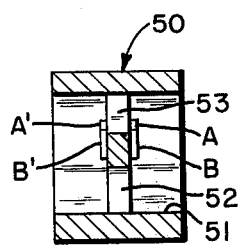
FIG. 10 is a cross section taken in the direction of the arrows 10—10 of FIG. 9; and, FIG. 11 is an elevational view partly in cross section of a narrow platform using flexure isolated load cells of the type shown in FIG. 2.

Referring now to FIGS. 9 and 10 there is shown a further modified flexure isolated load cell which could be used in place of the load cells shown in FIGS. 6 and 7. The only difference in the load cells of FIGS. 9 and 10 is in the strain gauge arrangement and load cell shear measuring end portion.

Referring specifically to FIG. 9, the load cell includes first and second end portions 49 and 50. The end portion 49 includes integral flexure means identical to that described in FIG. 7. The end portion 50 in turn includes a cut out window 51 having crossed bar portions 52 and 53. These bars are thin in a vertical plane and are provided with strain gauges A and B on one side and A', B' on the opposite side as clearly shown in FIG. 10.

Figure 11:
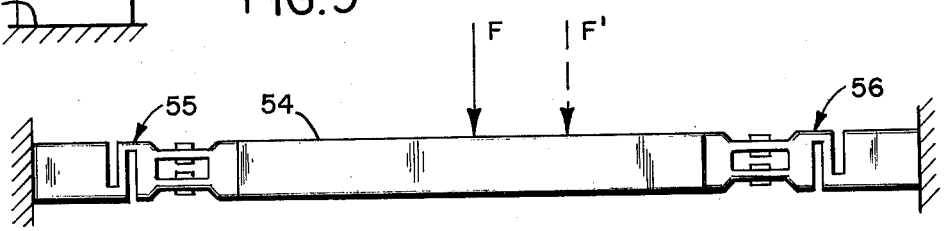

FIG. 11 illustrates in side view partly in cross section a platform 54 which may be similar to the platform 33 of FIG. 6 supported by two flexure isolated load cells 55 and 56 at each end as shown. The arrangement is similar to that shown in FIG. 6 except that the flexure portions of the load cells are comprised of only a single web. In this respect, the load cells 55 and 56 are similar to those shown in FIGS. 1 and 2.

The only purpose for the showing in FIG. 11 is to illustrate the fact that for fairly light loads wherein torsion forces are not of appreciable magnitude, only two isolated flexure load cells are necessary for supporting the platform wherein each of the load cells includes only a single flexure web.

In the embodiment of FIG. 11, isolation of bending moments along one axis is assured by the flexure arrangements in each of the load cells. Thus, there is illustrated an off loading force F' as opposed to a center force F. However, off loading in a direction normal to the one axis which passes through the points of connection of the load cells would not be isolated but as mentioned, for light loading, resulting torsional forces are of not appreciable magnitude. The embodiment of FIG. 11 would thus be limited to certain uses wherein torsional forces are not of importance and wherein economy in manufacture is desired.

With respect to the flexure portions of the load cells illustrated in FIGS. 6 through 10 wherein first and second flexure webs are provided at right angles to each other, all in alignment with the referred to straight line passing between the end portions of the load cell bodies, isolation of both moments and torsion forces will be assured since bending is absorbed by the flexures about two axes at right angles to each other.

As to the load measuring strain gauges and load measuring structures to which the strain gauges are secured, the type illustrated in FIGS. 2 and 3 is the most sensitive. For example, it would be used for loads varying perhaps between ten pounds and three hundred pounds.

The shear plate type of load cell structure with strain gauges attached as shown in FIGS. 4 and 5 on the other hand would be of very high capacity capable of accomodating loads from 2,000 to 20,000 pounds.

The load cell arrangement shown in FIGS. 7 and 8 wherein a single diagonal thin bar is provided would accomodate loads from 100 to a thousand pounds while the crossed bar arrangement shown in FIGS. 9 and 10 would accomodate loads from 300 to 2,000 pounds.

The various embodiments set forth merely illustrate the fact that the present invention contemplates various different combinations of shear measuring load cells with integrally formed flexures for realizing the desired end.

Further, it should be understood that the basic invention involves the isolation of horizontal type shear measuring load cells through the use of integrally formed flexures in one or both ends of the cell. In this respect, the flexure may be a circular section, a square section, or a web such as shown. Further, the load cell strain gauge portion itself may take other forms from those illustrated. The salient feature resides in the provision of at least two shear measuring flexure isolated load cells supporting a platform wherein undesired forces are isolated from reaching the strain gauges by the integrally formed flexure means.

Thus, while only particular embodiments of the present invention have been set forth, it is to be understood that various changes can be effected without departing from the basic scope of the invention.

What is claimed is:

1. At least two shear measuring flexure isolated load cells for connection between a stationary structure and peripheral points on a platform, each flexure isolated load cell comprising a load cell body having first and second end portions for securement respectively to a stationary structure and a peripheral point on said platform, a straight line passing through said first and second end portions being substantially parallel to the plane of said platform in the absence of any load on said platform,
  a. one of said end portions including a central cut-out to define spaced parallel body portions on opposite sides of said straight line passing between said end portions, and strain gauges fixed to opposite sides of said body portions responsive to a force on said platform having a component normal to the plane of said platform; and,
  b. the other of said end portions including integrally formed flexure means, said flexure means comprising oppositely directed slots in said other end portion of said body defining therebetween a flexure web lying in a plane perpendicular to said straight line and to the plane of said platform, whereby moments created by off-center loading of said platform are isolated from the strain gauge means on each load cell by the integrally formed flexure means in each load cell.

2. The subject matter of claim 1 including said platform in combination with said load cells, there being provided at least three of the load cells connected between said stationary structure and peripheral points on said platform so that torsion forces created by off-center loading of said platform are isolated from said strain gauge means.

* * * * *